United States Patent [19]
Pariot et al.

[11] Patent Number: 5,192,381
[45] Date of Patent: Mar. 9, 1993

[54] POWER DOOR SENSING STRIP

[75] Inventors: Robert Pariot, New Windsor, N.Y.; J. Mortimer Traugott, Riverton, N.J.

[73] Assignee: Techstrip Inc., Oaklyn, N.J.

[21] Appl. No.: 806,705

[22] Filed: Dec. 12, 1991

Related U.S. Application Data

[62] Division of Ser. No. 634,412, Dec. 27, 1990, Pat. No. 5,087,799.

[51] Int. Cl.⁵ .............................................. B32B 5/20
[52] U.S. Cl. ...................................... 156/79; 156/78; 156/293; 264/46.5; 264/46.6
[58] Field of Search ................ 264/46.5, 46.6, 46.9; 156/78, 79, 293

[56] References Cited

U.S. PATENT DOCUMENTS

| | | |
|---|---|---|
| 2,843,690 | 7/1958 | Miller . |
| 2,843,694 | 7/1958 | Bertaux . |
| 3,133,167 | 5/1964 | Miller . |
| 3,315,050 | 4/1967 | Miller . |
| 3,754,176 | 8/1973 | Miller . |
| 3,793,411 | 2/1974 | Stonitsch et al. ............... 264/46.5 |
| 4,116,893 | 9/1978 | Flanagan ....................... 264/46.6 X |
| 4,288,653 | 9/1981 | Blom et al. ..................... 264/46.5 X |
| 4,396,814 | 8/1983 | Miller . |
| 4,487,648 | 12/1984 | Miller . |
| 4,684,768 | 8/1987 | Sackmann et al. . |
| 4,785,143 | 11/1988 | Miller . |
| 4,891,081 | 1/1990 | Takahashi et al. ............... 156/78 |
| 4,954,673 | 9/1990 | Miller . |

FOREIGN PATENT DOCUMENTS 60-154015  8/1985  Japan ................... 264/46.6

Primary Examiner—David A. Simmons
Assistant Examiner—Mark A. Usele
Attorney, Agent, or Firm—Brumbaugh, Graves, Donohue & Raymond

[57] ABSTRACT

A power door sensing strip incorporates a pair of electrical conductors positioned in a sealed plastic tube and supported in a molded foam block so that external forces result in contact between the conductors. Reliable operation is afforded by the absense of internal supports between the conductors. Further, short circuits caused by moisture and contaminants entering the foam through breaks in an outer jacket are eliminated. Trimmable tails and electrical connections on the ends of the strip enable the strip to be used with doors of varying widths and for non-handed installation.

4 Claims, 1 Drawing Sheet

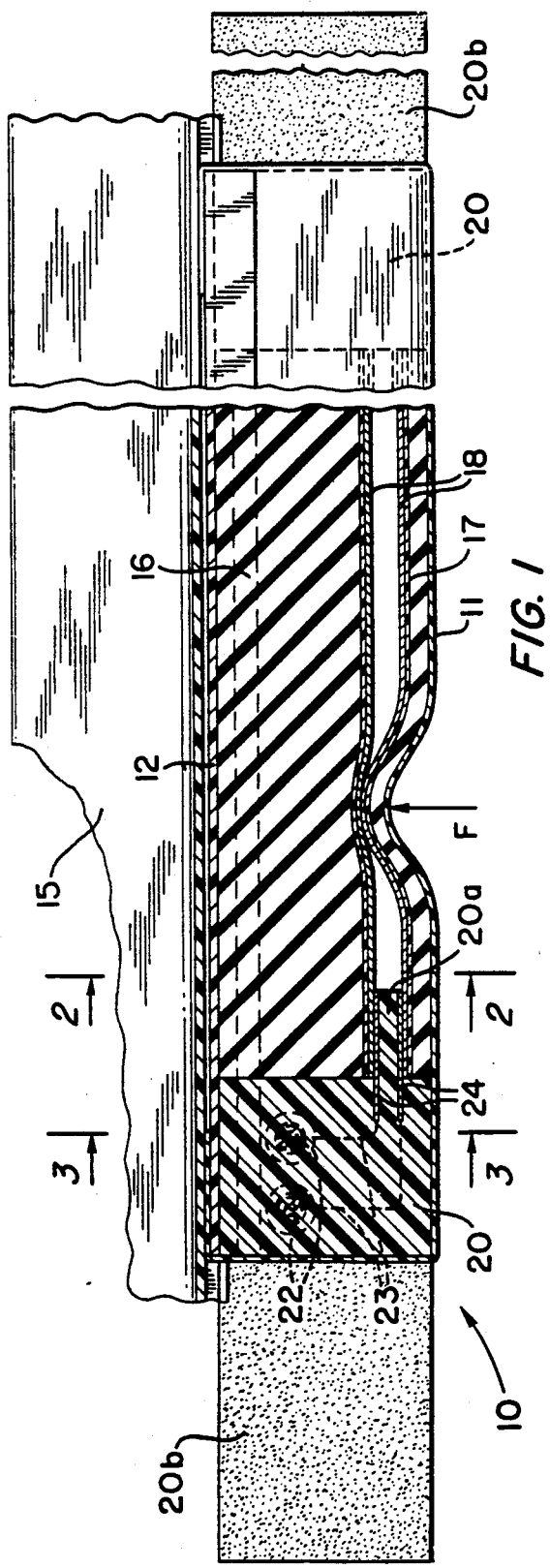

POWER DOOR SENSING STRIP

This application is a division of application Ser. No. 07/634,412, filed on Dec. 27, 1990 now U.S. Pat. No. 5,087,799.

BACKGROUND OF THE INVENTION

Electrical sensing strips are widely used on door edges to provide safe power door operation. A person or object in the door closure path causes the strip to deform and an electrical contact to close, resulting in immediate deenergization or reversal of the drive motor. Thus injury to the person or object obstructing closure of the door is prevented.

One type of sensing strip, disclosed in U.S. Pat. No. 3,315,050 to Miller, utilizes a pair of foam pads carrying conductive aluminum sheets Intermediate the foam pads is another foam strip formed with openings Upon deformation of the outer foam pad, the aluminum sheets are forced into contact through one of the openings to close a suitable circuit.

Operating problems occur with the Miller type strips when the strip jacket is ruptured by abrasion or puncture, permitting moisture and contaminants to enter the foam pads. This causes the foam between the aluminum contacts to become conductive, resulting in short circuits between the aluminum sheets Door closure is interrupted, a serious disadvantage in power door operation.

BRIEF SUMMARY OF THE INVENTION

The present invention provides an improved power door sensing strip impervious to moisture and contaminants and reliably operative when engaged by an object.

More specifically, the inventive sensing strip incorporates a pair of electrical conductors positioned in a sealed plastic tube and supported in a molded foam block so that external forces result in contact between the conductors. To insure reliable operation, there are no internal supports placed between the conductors. In addition, short circuits caused by moisture and contaminants entering the foam, in the event an outer jacket seal is broken, are eliminated.

To provide the inventive sensing strip, a pair of conductors are positioned in a plastic tube, and a casting mandrel inserted into the tube. This assembly then is suitably positioned in a plastic jacket, previously placed in a mold, and urethane foaming chemicals injected into the jacket around the tube-mandrel assembly. A suitable top, incorporating door attachment means, is also molded into the strip in the original mold. Molded relatively impressible blocks, which incorporate electrical terminals to make the strip non-handed, are inserted into the jacket and secured to the strip. To facilitate installation of the strip on doors of varying width, a trimmable tail can be molded into at least one of the blocks.

The resulting strip, readily secured to a power door, provides reliable sensing of objects encountered by the door over long periods, regardless of jacket abrasion or punctures leading to moisture and contaminants entering the molded foam.

These and other features and advantages of the invention will be more readily understood when the following description is read in connection with the accompanying drawings.

DESCRIPTION OF THE DRAWINGS

FIG. 1 is a longitudinal cross-section taken along the view line 1—1 of FIG. 2 showing the inventive power door sensing strip;

FIG. 2 is a cross-section of the strip taken along the view line 2—2 of FIG. 1;

FIG. 3 is a cross-section of a terminal end of the strip taken along the view line 3—3 in FIG. 1; and FIG. 4 is a fragmentary cross-section of a part of the inventive strip.

DESCRIPTION OF EXEMPLARY EMBODIMENTS

Referring to the drawings in greater detail, a power door sensing strip 10 is formed by a tough and flexible plastic jacket 11, for example, a reinforced vinyl jacket, affixed to a top cover 12 formed of an appropriate plastic. Longitudinal slots 13 on the cover 12 receive mating T-shaped projections 14 on an edge of a power door 15.

The jacket 11 contains a block of flexible foam 16, for example, a polyurethane foam, surrounding a sealed tube 17, for example a polyethylene welded sleeve. Conductors 18 of aluminum foil laminated to thin polyester films 19 (FIG. 4) are bonded by a suitable acrylic adhesive to opposing inner surfaces of the tube 17. In the interests of simplicity, the laminates in the tube 17 are shown as foil conductors 18. The foam 16 is bonded to the tube 17, as explained below, to insure a permanent stable location of the conductors 18 in the sealed and moisture-proof tube 17.

At the ends of the strip 10 and within the jacket 11 are relatively incompressible blocks 20 molded of suitable plastic, for example, casting urethane of a durometer that permits slight compressibility, incorporate screw terminals 22 and conductors 23. A tongue 20a and tail 20b also form parts of the block 20. The screw terminals 22, embedded at suitable locations in the blocks 20 at each end of the strip, for left or right hand connections, i.e., the strip is advantageously non-handed, are electrically connected by the conductors 23 to foil pickup plates 24. Upon insertion of the tongue 20a into the tube 17, the foil plates 24 provide permanent electrical contacts with conductor foils 18. The screw terminals are adapted to be wired to suitable circuits for controlling operation of the power door 15.

In order to mold the inventive strip 10, the reinforced vinyl jacket 11 is positioned in a suitable forming mold to provide a cover for the strip that protects the internal elements from abrasion and contaminants.

The sealed tube 17 incorporating the conductors 18 is provided by laminating thin aluminum foil, for example 0.00035" thick, to a thin polyester film, for example 0.00048" thick; see FIG. 4. The laminate is then fastened by an acrylic adhesive in the polyethylene tube. The flattened portions 17a of the tube 17 result from operations in producing the tube.

After treating the tube 17 with a coating of hydrogenated resin bonder to insure permanent positioning in the polyurethane foam block, a mandrel dimensioned to provide spaced apart conductors 18, is inserted into the tube, and the mandrel and tube 17 are next placed inside the jacket 11, which had previously been inserted into the forming mold. These elements are then suitably held in the position shown in the drawings.

Low density polyisocyanates urethane foaming chemicals, for example 3 pounds per cubic foot material, are injected into the mold, and the top cover 12 then placed in position. Additional adhesive beads 12a may also be used to seal and secure the cover 12 to the jacket 11.

The mold lid is then closed and the expansion and exothermic heat developed by chemical reaction sets all related parts, i.e., the adhesives, bonding agents and urethane foam, to the contour of the mold and mandrel located in the tube 17. The pressure developed in the mold may be on the order of 20 pounds per square inch, which results in a tight monolithic sensing strip. The mandrel is then removed from the tube 17.

Each of the molded blocks 20 is inserted into the jacket 11, which extends beyond the block 16 of flexible foam, and the tongue 20a, made slightly thicker than the tube 17, is wedged into the tube so that the foil pickup plates 24 electrically contact the foil conductors 18. A suitable adhesive is used to bond the blocks 20 to the urethane foam (which effectively seals the end of the tube 17), the cover 12, which extends a suitable distance past the urethane block, and the jacket 11. Note that the jacket 11 and cover 12 do not extend along the tails 20b, which may be several inches in length.

With the foregoing structure, the width of the strip 10, i.e., the weather-seal, can be adjusted by trimming the tails 20b to a suitable length with a simple knife, without impairing the jacket 11 which seals the strip, or interfering with electrical connections. Moreover, the trimmable tails 20b can function to block air spaces between pieces of angle irons, for example, found at the ends of door tracks, to help in weather-proofing the door. To perform this function, the tails 20b are preferably narrower than the block 20, for example about one-half as wide, and extend from the center of the block (as viewed from above the strip 10).

It will be appreciated that the blocks 20 at each end of the strip 10 provide resting pads to support door weight or force as it closes, yet the blocks do not interfere with deformation of the strip for sensing purposes.

Referring to FIG. 1, with movement of the strip 10 during door closure, an object in the door's path will cause a force, indicated by the arrow F, to deform the strip 10 and force the two conductive foil strips 18 into contact, thereby closing the circuit connected to the terminals 22 to stop or reverse the power door closing mechanism.

From the foregoing description, it is apparent that the inventive strip reliably functions to sense objects in the closure path of a power door. In addition, abrasions or punctures in the jacket 11, permitting entry of moisture, will not affect operation of the sensing strip since the conductors 18 are sealed within the plastic tube 17. The strip may be adjusted in length conveniently to fit varying width doors. Preferably electrical connections are provided at both ends to render the strip non-handed.

The invention has been described with reference to a specific embodiment. It will be understood, however, that various changes and modifications may be made within the scope of the invention which is defined in the appended claims.

I claim:

1. A process of providing an elongated sensing strip for attachment to a power door edge for sensing an object obstructing closure of the door comprising the steps of adhering two foil conductors to opposite inner sides of a flexible plastic tube, positioning an elongated jacket for the strip in a mold, inserting a mandrel into the plastic tube, positioning the plastic tube and mandrel in the mold, injecting low density urethane foaming chemicals into the mold, placing a cover in the mold engaging the edges of the jacket and the urethane, closing the mold and molding the strip under pressure, removing the formed strip from the mold and the mandrel from the tube, molding relatively incompressible plastic blocks with at least one of the blocks encapsulating electric connectors and conductors adapted to be connected to the foil conductors, and adhesively securing the molded blocks in the jacket and to the foam with the conductors electrically connected to the foil conductors in the plastic tube.

2. A process as defined in claim 1, wherein during the step of molding the one or the other or both of the plastic blocks, a trimmable tail is molded to extend from the block or blocks, the tail or tails facilitating installation of the strip on doors of varying width.

3. A process as defined in claims 1 or 2, wherein during the step of molding at least one of the plastic blocks, a tongue is molded to extend from the one block with pickup conductors located on opposite sides of the tongue, the tongue extending into the tube with the pickup conductors in contact with the foil conductors in the sealed tube.

4. A process as defined in claims 1 or 2, wherein during the step of molding the plastic blocks, electric connectors and conductors are encapsulated into both of the blocks.

* * * * *